(12) United States Patent
Chang

(10) Patent No.: US 9,411,690 B2
(45) Date of Patent: Aug. 9, 2016

(54) SECURITY SURVEILLANCE APPARATUS WITH NETWORKING AND VIDEO RECORDING FUNCTIONS AND FAILURE DETECTING AND REPAIRING METHOD FOR STORAGE DEVICE THEREOF

(71) Applicant: VIVOTEK INC., New Taipei (TW)

(72) Inventor: Chien-Wei Chang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 185 days.

(21) Appl. No.: 14/281,399

(22) Filed: May 19, 2014

(65) Prior Publication Data

US 2014/0372798 A1 Dec. 18, 2014

(30) Foreign Application Priority Data

Jun. 14, 2013 (TW) .............................. 102121250 A

(51) Int. Cl.
| | |
|---|---|
| *G06F 11/07* | (2006.01) |
| *G06F 11/14* | (2006.01) |
| *G11B 27/10* | (2006.01) |
| *G11B 27/32* | (2006.01) |
| *G11B 27/36* | (2006.01) |

(52) U.S. Cl.
CPC ........ *G06F 11/1464* (2013.01); *G06F 11/1402* (2013.01); *G11B 27/105* (2013.01); *G11B 27/329* (2013.01); *G11B 27/36* (2013.01)

(58) Field of Classification Search
CPC .................................................. G06F 11/1435
USPC ..................................................... 714/15, 6.1
See application file for complete search history.

(56) References Cited

U.S. PATENT DOCUMENTS

| | | | |
|---|---|---|---|
| 7,886,201 B2 | 2/2011 | Shi et al. | |
| 2001/0054162 A1* | 12/2001 | Park .................. | H04L 1/0047 714/52 |
| 2002/0112116 A1* | 8/2002 | Nelson .............. | G06F 12/0246 711/103 |
| 2004/0243736 A1* | 12/2004 | Hattrup ............. | G06F 3/0605 710/15 |
| 2007/0041719 A1* | 2/2007 | Takada .............. | G11B 27/11 386/239 |
| 2007/0220308 A1* | 9/2007 | Yeung ............... | G06F 11/1469 714/5.1 |
| 2007/0260864 A1* | 11/2007 | Qi ..................... | G06F 11/2247 713/1 |
| 2007/0286050 A1* | 12/2007 | Araki ................ | G11B 27/034 369/99 |
| 2009/0129227 A1* | 5/2009 | Tai .................... | G11B 19/047 369/53.35 |

(Continued)

FOREIGN PATENT DOCUMENTS

| | | |
|---|---|---|
| CN | 1908900 A | 2/2007 |
| EP | 1390849 A1 | 2/2004 |

(Continued)

OTHER PUBLICATIONS

European Patent Office, "Office Action", Jan. 13, 2015.

*Primary Examiner* — Chae Ko

(74) *Attorney, Agent, or Firm* — Maschoff Brennan

(57) ABSTRACT

A security surveillance apparatus with a networking function and a video recording function and a failure detecting and repairing method for a storage device are provided. The failure detecting and repairing method includes the following steps. First, the storage device is powered and detected. Then, whether a file system of the storage device is abnormal is determined. When the file system is abnormal, the file system is repaired by a file system repairing procedure. Next, whether a multimedia file is abnormal is determined. When the multimedia file is abnormal, the multimedia file is repaired by a file repairing procedure. Finally, the storage device is mounted on the security surveillance apparatus.

18 Claims, 3 Drawing Sheets

(56) References Cited

U.S. PATENT DOCUMENTS

| | | | |
|---|---|---|---|
| 2011/0229105 A1* | 9/2011 | Khan | H04N 5/765 386/200 |
| 2011/0255747 A1* | 10/2011 | Iwasaki | G06K 9/00348 382/103 |
| 2012/0075469 A1* | 3/2012 | Oskin | G08B 13/19656 348/143 |

FOREIGN PATENT DOCUMENTS

| | | | |
|---|---|---|---|
| EP | 1768130 A2 | | 3/2007 |
| JP | 2004192402 A | | 7/2004 |
| KR | 2007040988 A | * | 10/2005 |
| TW | 200619927 | | 6/2006 |
| TW | 200736936 | | 10/2007 |
| WO | 02099642 A1 | | 12/2002 |

* cited by examiner

SECURITY SURVEILLANCE APPARATUS WITH NETWORKING AND VIDEO RECORDING FUNCTIONS AND FAILURE DETECTING AND REPAIRING METHOD FOR STORAGE DEVICE THEREOF

CROSS-REFERENCE TO RELATED APPLICATIONS

This non-provisional application claims priority under 35 U.S.C. §119(a) on Patent Application No(s). 102121250 filed in Taiwan, R.O.C. on Jun. 14, 2013, the entire contents of which are hereby incorporated by reference.

TECHNICAL FIELD

The disclosure relates to a failure detecting and repairing method for a storage device, more particularly to a security surveillance apparatus with a networking function and a video recording function and a failure detecting and repairing method for a storage device.

BACKGROUND

Video monitoring and security surveillance services have become very common. Over the decades, closed-circuit television (CCTV) surveillance systems were used to ensure security, and recently intelligent security surveillance apparatuses are applied to ensure security more and more with the development of digital videos and digital image process. For example, intelligent security surveillance apparatuses can be installed at airports, subway stations, banks, or hotels to identify terrorists or suspects. The security surveillance apparatus continues recording videos against persons or rooms to be monitored and storing the videos in a storage device. Generally, the security surveillance apparatus has to unceasingly record videos day by day, whereby administrators can survey the recorded data about a certain happened event.

However, when the storage device is improperly unmounted or a power cut suddenly occurs on the security surveillance apparatus or the storage device, the file system of the storage device may become abnormal. If the data in the storage device is accessed via the abnormal file system, errors will occur on the access of data, resulting in one or more blank periods in the recording period. This will weaken the achievement of security surveillance. Moreover, since data is continuously written into the storage device during the video recording, malfunctions such as badblocks may occur. Until now, security surveillance products in the market nowadays can not deal with these problems.

SUMMARY

According to one or more embodiments, the disclosure provides a failure detecting and repairing method. In one embodiment, the failure detecting and repairing method may be applied to a security surveillance apparatus with a networking function and a video recording function and include the following steps. First, power and detect a storage device. Then, check a file system of the storage device and determine whether the file system is abnormal. When the file system is abnormal, the file system may be repaired by a file system repairing procedure. Next, check at least one multimedia file in the storage device and determine whether the at least one multimedia file is abnormal. When the at least one multimedia file is abnormal, the at least one multimedia file is repaired by a file repairing procedure. Finally, mount the storage device on the security surveillance apparatus. In one embodiment, the failure detecting and repairing method may further include reading out a disk partition table about the storage device and according to the disk partition table, determining whether the partitioning of the storage device is abnormal. When the partitioning of the storage device is abnormal, a warning message may be sent out.

According to one or more embodiments, the disclosure provides a security surveillance apparatus with a networking function and a video recording function. In one embodiment, the security surveillance apparatus may include an image receiving device, a storage device connection interface, and a control device. The image receiving device may receive multimedia data. The storage device may store at least one multimedia file. The control device may connect to the image receiving device and the storage device connection interface. When the security surveillance apparatus starts up or when the storage device connects to the control device, the control device may detect the storage device. Then, the control device may check a file system of the storage device and determine whether the file system is abnormal. When the file system is abnormal, the control device may perform a file system repairing procedure to repair the file system. Next, the control device may check a multimedia file in the storage device and determine whether the multimedia file is abnormal. When the multimedia file is abnormal, the control device may perform a file repairing procedure to repair the multimedia file. Finally, the control device may mount the storage device on the security surveillance apparatus. In one embodiment, the control device may read out a disk partition table about the storage device and according to the disk partition table, determine whether the partitioning of the storage device is abnormal. When the partitioning of the storage device is abnormal, the control device may send out a warning message.

BRIEF DESCRIPTION OF THE DRAWINGS

The present disclosure will become more fully understood from the detailed description given herein below for illustration only and thus does not limit the present disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The disclosure provides a security surveillance apparatus and a failure detecting and repairing method for a storage device. The security surveillance apparatus supports a networking function and a video recording function and can perform the failure detecting and repairing method.

In one or more embodiments, the security surveillance apparatus may be a security surveillance product supporting the multimedia streaming, such as a video server, a network video recorder (NVR), an Internet protocol camera (IP camera), or any possible electric device supporting Internet access, remote monitoring, and video recording.

Figure 1:
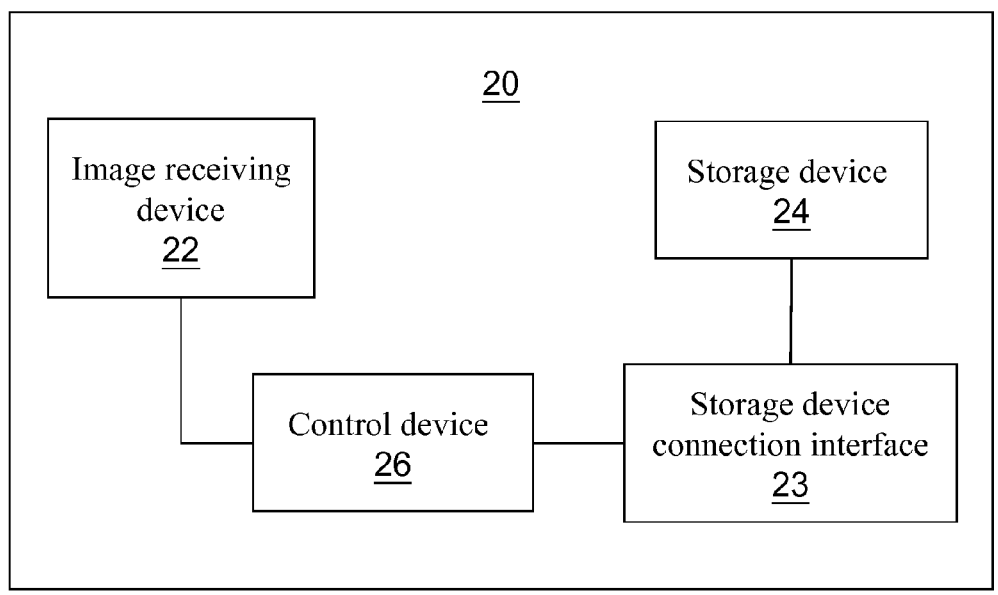
FIG. 1 is a functional block diagram of an embodiment of a security surveillance apparatus with a networking function and a video recording function in the disclosure.

FIG. 1 is a functional block diagram of an embodiment of a security surveillance apparatus with a networking function and a video recording function in the disclosure. A security surveillance apparatus 20, as shown in FIG. 1, may include an image receiving device 22, a storage device connection interface 23, a storage device 24, and a control device 26.

The image receiving device 22 may receive multimedia data. In one or more embodiments, the source of the multimedia data may be a lens set with a charge-coupled device (CCD), a lens set with complementary metal-oxide-semiconductors (CMOS), an Internet protocol camera (IP camera), or a CCTV camera. In one or more embodiments, the lens set may include a fisheye lens, a wide-angle lens, a normal lens, or a telephoto lens.

The storage device connection interface 23 may connect to the storage device 24. The storage device connection interface 23 may be a conventional interface such as USB or SATA.

The storage device 24 may store at least one multimedia file. In one embodiment, the storage device 24 may be a built-in device. In some embodiments, the storage device 24 may be an external device outside the security surveillance apparatus 20. In one or more embodiments, the storage device 24 may be one or more memory cards, one or more 2.5-inch hard disk drives, one or more 3.5-inch hard disk drives, or one or more redundant array of inexpensive disks (RAID). After the image receiving device 22 receives the multimedia data, the control device 26 may process the multimedia data to generate the at least one multimedia file and then store the at least one multimedia file in the storage device 24. Therefore, the at least one stored multimedia file can be playbacked later.

In one embodiment, the storage device 24 may manage one or more stored multimedia files according to a file system. In one or more embodiments, the file system may be a file allocation table 32 (FAT32), an extended file allocation table (exFAT, or called FAT64), or an extended file system (Ext4). In one or more embodiments, the multimedia file may conform to the H.264 standard, the moving picture experts group (e.g. MPEG-2 and/or MPEG-4), the motion joint photographic experts group (MJPEG), the advanced audio coding (AAC) standard, the audio video interleave (AVI) standard, the third generation presence (3GP) standard, or any combination thereof.

The control device 26 may connect to the image receiving device 22 and the storage device connection interface 23.

In one or more embodiments, the electric elements in the security surveillance apparatus 20 may be separated from each other, that is, the control device 26, the image receiving device 22, the storage device connection interface 23, and the storage device 24 may be disposed at various electric apparatuses respectively and connect to each other to communicate multimedia data and multimedia files.

Since the security surveillance apparatus 20 supports the networking function, the control device 26 may wirelessly or wiredly send multimedia data or one or more multimedia files to a receiving terminal via a transmission device in one or more embodiments. In one or more embodiments, the receiving terminal may be a server or a terminal apparatus, and the terminal apparatus may be a personal computer (PC), a mobile phone, a tablet computer, or any possible apparatus.

Figure 2A:
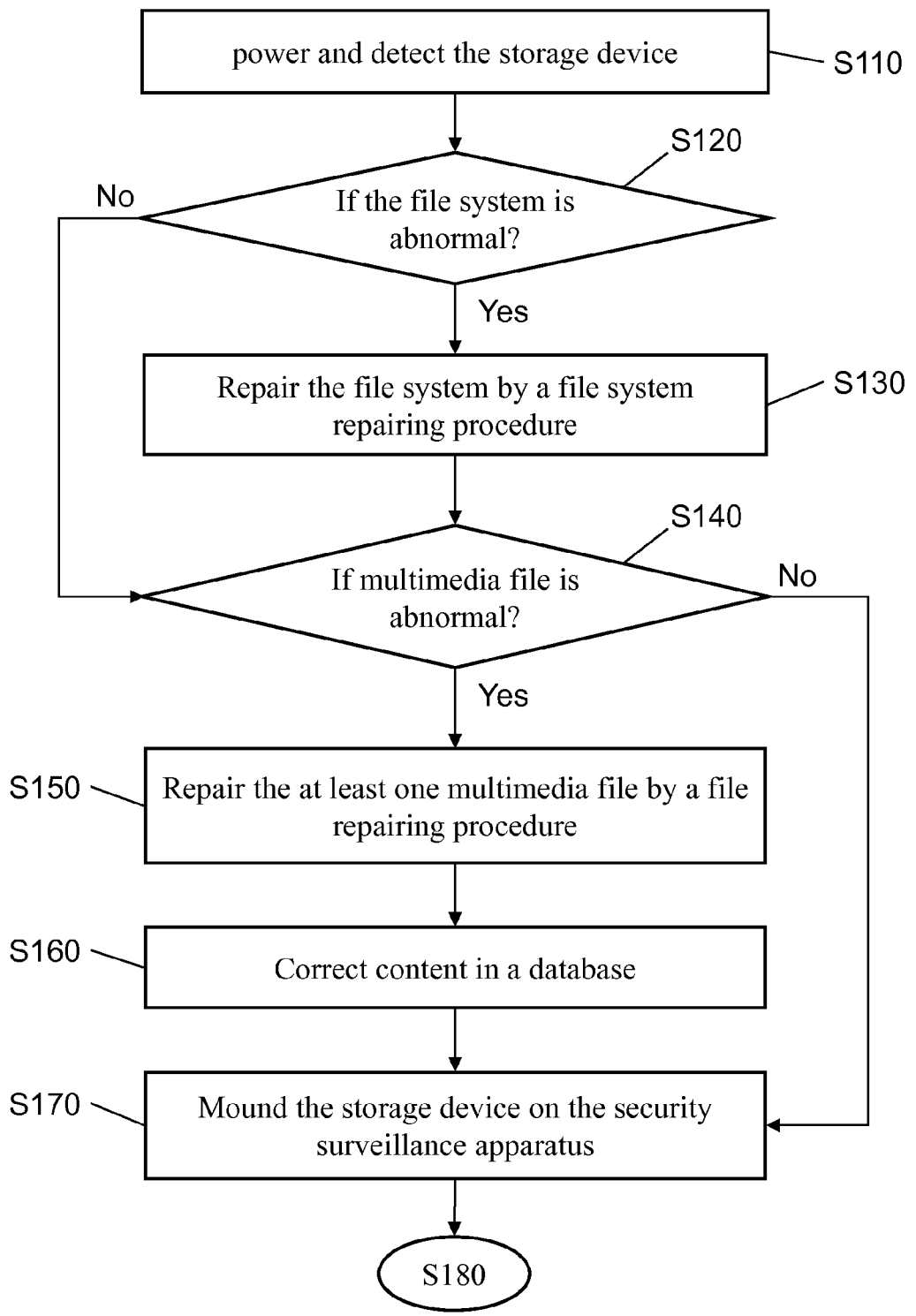
FIG. 2a and FIG. 2b illustrate a flow chat of an embodiment of a failure detecting and repairing method for a storage device in the disclosure.
Figure 2B:
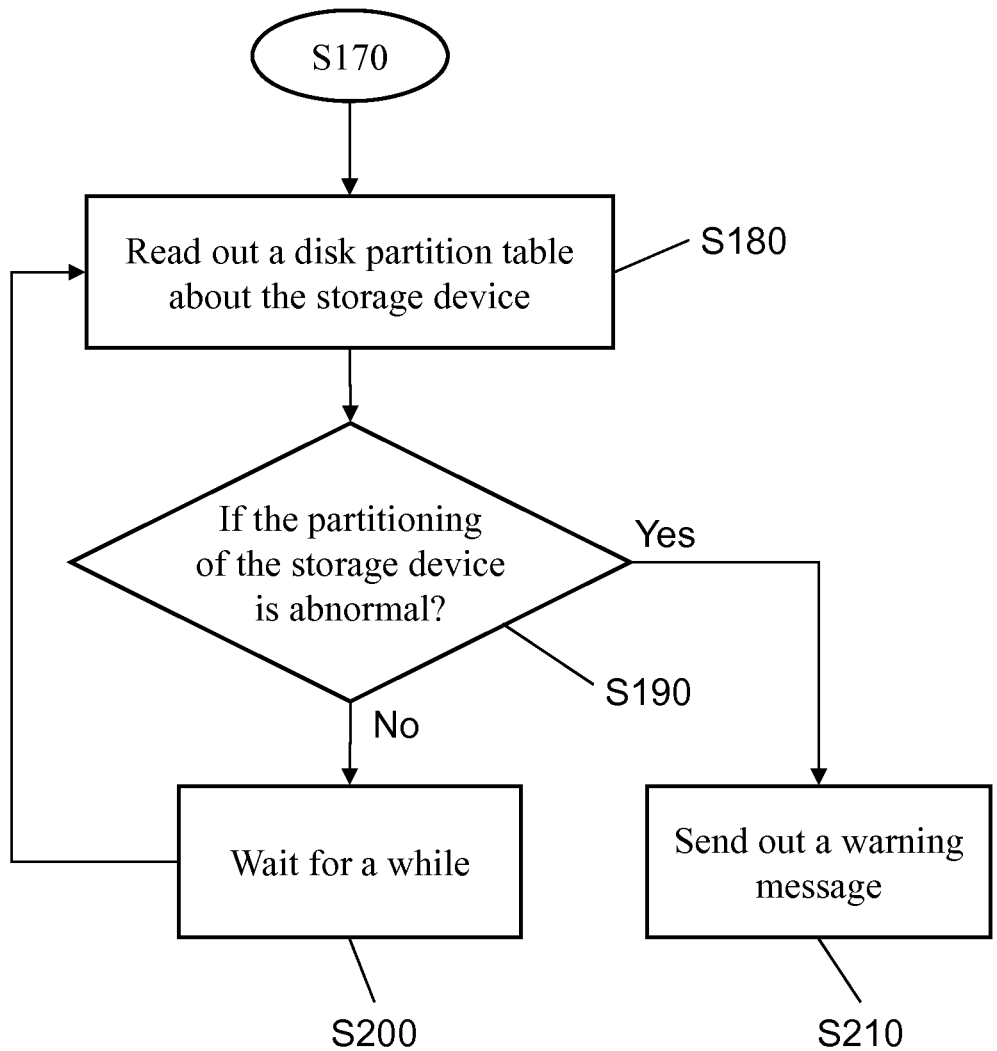

In view of the above description, the security surveillance apparatus 20 performs the failure detecting and repairing method as shown in FIG. 2a and FIG. 2b. FIG. 2a is a flow chart of a first part of the failure detecting and repairing method. The first part of the failure detecting and repairing method may include the following steps.

First, the security surveillance apparatus 20 may power and detect the storage device 24 (step S110). Specifically, the control device 26 may power and detect the storage device 24 when the security surveillance apparatus 20 starts up or when the storage device 24 connects to the control device 26.

Then, the control device 26 may check the file system of the storage device 24 and determine whether the file system is abnormal (step S120). In one exemplary embodiment, the control device 26 may utilize a file system tool to check the validity of the file system, for example, a file allocation table (FAT) of FAT16, a FAT32, an exFAT, a superblock of Ext2, a journal of Ext3, or a journal of Ext4.

When the file system is abnormal, the control device 26 may repair the file system (step S130). Since the FAT16, FAT32, Ext2, Ext3, Ext4, and exFAT all have their own repairing procedure for repairing file systems, the control device 26 may directly call one repairing procedure for the file system to automatically repair an abnormal file system. In one exemplary embodiment, the control device 26 may employ an instruction of "Dosfsck -a/dev/mmcblk0p1" to automatically repair a FAT16 and a FAT32 file system. In one exemplary embodiment, the control device 26 may employ an instruction of "Fsck -p/dev/mmcblk0p1" to automatically repair an Ext2, an Ext3, or an Ext4 file system. In one exemplary embodiment, the control device 26 may employ an instruction of "exfatfsck/dev/mmcblk0p1" to automatically repair an exFAT file system. In the above instructions, the parameters "-a" and "-p" indicate that to automatically repair a file system without the interaction between the system and users, and the "/dev/mmcblk0p1" indicates a path to a file system or a file system device to be repaired.

When the file system is normal or after the file system is repaired, the control device 26 may check whether the multimedia file is abnormal (step S140). In one embodiment, all multimedia files in the storage device 24 may be checked. Generally, since the last video file recorded newly may be updated before a power cut, the last video file may be an abnormal multimedia file. In some embodiments, only the newly-updated file may be checked. In some embodiments, only the newly-updated file and one or more files, whose updating time and an updating time of the newly-updated file has an interval therebetween that is shorter than a threshold, may be checked.

Each multimedia file in the storage device 24 may include a header and a file majority (or called body). Therefore, through checking the header of a file, the control device 26 may know whether this file is abnormal. In detail, when the header of the multimedia file is incomplete or does not match the file majority of the multimedia file, the control device 26 may determine that this multimedia file is abnormal.

In one or more embodiments, the header of each multimedia file may include one or more fields for a file identifier, a header length, a file length, codec information, an information verification code, intelligent video recording information, or a combination of them. The codec information may indicate a specific codec and include parameters for the codec to the displaying of the multimedia file. The intelligent video recording information may include extra metadata information that the intelligent video recording needs, such as the motion detection supported by a surveillance camera, whereby a player may show extra information according to the intelligent video recording information during the displaying of the multimedia file. The information verification code may be used for checking the accuracy of data. For example, when multimedia data is converted to a multimedia file, the control device 26 may process the header or file majority of the multimedia file or the entire multimedia file by the message-digest algorithm 5 (md5), set the process result as an information verification code, and store the information verification code in the header, for making sure that the content of the multimedia file is complete. In the disclosure, the one or more fields of a header may vary with the format of a multimedia file. According to the one or more fields of the header, the control device 26 may be able to determine whether the header of the multimedia file is complete or determine whether the header matches the file majority of the multimedia file.

In one or more exemplary embodiments, the control device 26 may determine whether the header is complete, according to the header length or the information verification code. When the header is incomplete, the control device 26 may determine that the multimedia file corresponding to this incomplete header is abnormal.

In one exemplary embodiment, when a file length recorded in a header is different from a main body length of a file majority corresponding to the header, the control device 26 may determine that the header does not match the file majority. In other words, the control device 26 may count the main body length of the file majority of the multimedia file and then compare the main body length with the file length recorded in the header. Presume that the file length represents a full length of the entire multimedia file. In this case, when the sum of the main body length and the header length is equal to the file length, the control device 26 will determine the header matches the file majority. Presume that the file length represents a total length of the entire file majority. In this case, when the main body length is equal to the file length, the control device 26 will determine the header matches the file majority. Once a header of a file does not match a file majority of the file, the control device 26 will determine the file is abnormal.

Following step S140, when the multimedia file is abnormal, the control device 26 may use a file repairing procedure to repair the abnormal multimedia file (step S150). After the control device 26 finds out all multimedia files whose header is incomplete or does not match the file majority in step S140, the control device 26 may use the repairing procedure to repair these collected multimedia files. In one embodiment, when the header is incomplete, the repairing procedure may analyze content of the file majority or entire multimedia file to rewrite the one or more incomplete or wrong fields in the header. In one embodiment, when the file length of the multimedia file is different from the main body length, the repairing procedure may directly rewrite the file length by the counted main body length.

In one embodiment, when the security surveillance apparatus 20 is recording a multimedia file (i.e. converting multimedia data to the multimedia file), because of the occurrence of an accident such as a power cut, the multimedia file may be incomplete (e.g. the file length is different from the main body length). Herein, the repairing procedure may delete incomplete multimedia content in the file majority and according to the remaining part, to rewrite the header.

In one or more embodiments, files in the storage device 24 may be managed through a database. In this case, when all newly-updated and checked files are normal or when the file repairing finishes, if the content in a database does not match these files in the storage device 24, the content in the database may also need to be corrected (step S160). In one embodiment, when a new piece of data has been added in the database before a power cut occurs, and the new piece of data is not stored in a SD card because of the power cut, the new piece of data may need to be deleted from the database. In one embodiment, when a new video file has been added but is not stored in the database before a power cut occurs, the record for the new video file may need to be added in the database. However, in some embodiments, step S160 may be unnecessary if the multimedia file is not managed through the database.

After the steps of checking and repairing finish, the control device 26 may mount the storage device 24 on the security surveillance apparatus 20, whereby the storage device 24 may be able to be accessed normally (step S170).

After the storage device 24 is mounted on the security surveillance apparatus 20, the security surveillance apparatus 20 may convert the multimedia data received by the image receiving device 22 to a new multimedia file and then store this new multimedia file in the storage device 24 normally.

Sequentially, a second part of the failure detecting and repairing method is shown in FIG. 2b. The security surveillance apparatus 20 in FIG. 1 may perform the second part of the failure detecting and repairing method as follows.

Following step S170, the security surveillance apparatus 20 may read out a disk partition table about the storage device 24 via the control device 26 (step S180). The storage device 24 may include at least one disk partition, and the at least one disk partition in the storage device 24 may be managed according to a disk partition table. In one or more embodiments, the disk partition table may recite a first cylinder index, a last cylinder index, and a number of cylinders corresponding to the at least one disk partition.

Then, the security surveillance apparatus 20 may, according to the disk partition table, determine whether the partitioning of the storage device 24 is normal (step S190). In detail, the security surveillance apparatus 20 may employ the control device 26 to read out the first cylinder index, the last cylinder index, and the number of cylinders corresponding to each disk partition of the storage device 24 in the disk partition table about the storage device 24. When the first cylinder index does not match a default value, the control device 26 may determine that the partitioning of the storage device 24 is abnormal. When the last cylinder index of one disk partition is larger than the number of cylinders of this disk partition in the disk partition table about the storage device 24, the control device 26 may determine that the partitioning of the storage device 24 is abnormal.

When the partitioning of the storage device 24 is abnormal, the security surveillance apparatus 20 may send out a warning message via the control device 26 (step S210). Through the warning message, users may know that the partitioning of the storage device 24 is abnormal. In one or more embodiments, the warning message may be a warning text, a warning picture, a light indication, an audio indication, a mail, or a combination of them.

In one embodiment, if the warning message is a warning text or a warning picture, the warning message may be sent to a remote host linking to the security surveillance apparatus 20 through a network and be shown on the screen of the remote host in order to notify users. As the warning message, the warning text or the warning picture may include the first cylinder index different from the default value, the last cylinder index larger than the number of cylinders, the disk name or disk identifier of the abnormal disk partition, or a combination of them.

In one embodiment, if the warning message is a light indication, the security surveillance apparatus 20 may notify users via a state light that is flashing.

In one embodiment, if the warning message is an audio indication, the security surveillance apparatus 20 may drive an audio device to generate a sound for notifying users.

In one embodiment, if the warning message is a mail, the security surveillance apparatus 20 may send an e-mail to users. The e-mail as the warning message may include the first cylinder index different from the default value, the last cylinder index larger than the number of cylinders, the disk name or disk identifier of the abnormal disk partition, or a combination of them.

Furthermore, when the partitioning of the storage device 24 is abnormal, the control device 26 may perform the data backup procedure or the data reconstruction procedure. In one embodiment, when the data backup procedure is performed, a backup copy for data received by the image receiving device 22 may be sent to a remote online storage device in a network or to an external storage device. In one embodiment, when the security surveillance apparatus 20 performs the data reconstruction procedure, the control device 26 may rebuilt new disk partitions after deleting all previous disk partitions. In one embodiment, the data reconstruction procedure may make a new copy of the above backup copy in the remote storage device or the external storage device and store the new copy in the storage device 24 after the data backup procedure is performed.

The control device 26 may continue monitoring and determining whether the at least one disk partition is abnormal. When the partitioning of the storage device 24 is normal, the control device 26 may wait for a while (step S200) and then read out the disk partition table about the storage device 24 (step S180) again.

In view of the above one or more embodiments, the security surveillance apparatus and the failure detecting and repairing method in the disclosure may automatically detect whether a storage device is abnormal when the security surveillance apparatus starts up or connects to the storage device. When the storage device is abnormal, the control device may automatically repair the storage device. Thus, even if a little stored data loses during the repairing process, the security surveillance apparatus will be able to normally operate to continue the video recording and the security surveillance. Moreover, when during the video recording the partitioning of storage device is abnormal, the control device may send out a warning message to notify users. The warning message sent by the control device may include detailed information about the abnormal partitioning whereby users may be able to remove this situation according to the detailed information. Also, the security surveillance apparatus may automatically perform a data backup procedure and/or a data reconstruction procedure to prevent data from loss and damage.

In this way, even if an accident such as a power cut, a power trip, a crash, or a wrong operation of the file system occurs, the disclosure may be able to automatically check and repair files data, thereby enhancing the reliability of video recording.

What is claimed is:

1. A failure detecting and repairing method for a storage device, applied to a security surveillance apparatus with a networking function and a video recording function and comprising the following steps of:
powering and detecting the storage device;
checking a file system for the storage device and determining whether the file system is abnormal;
repairing the file system by a file system repairing procedure when the file system is abnormal;
checking at least one multimedia file in the storage device and determining whether the at least one multimedia file is abnormal;
repairing the at least one multimedia file by a file repairing procedure when the at least one multimedia file is abnormal; and
mounting the storage device on the security surveillance apparatus,
wherein the at least one multimedia file comprises a header and a file majority, and the step of checking the at least one multimedia file in the storage device and determining whether the at least one multimedia file is abnormal comprises: when the header of the at least one multimedia file does not match the file majority, determining that the at least one multimedia file is abnormal; and
wherein the step of when the header of the at least one multimedia file does not match the file majority, determining that the at least one multimedia file is abnormal comprises:
checking a newly-updated file corresponding to a first updating time of the at least one multimedia file; and
checking a file corresponding to a second updating time of the at least one multimedia file, and an interval between the first updating time and the second updating time being shorter than a threshold.

2. The failure detecting and repairing method according to claim 1, wherein the step of repairing the at least one multimedia file by the file repairing procedure comprises:
correcting content in a database, which corresponds to the at least one multimedia file.

3. The failure detecting and repairing method according to claim 1, wherein the step of checking the at least one multimedia file in the storage device and determining whether the at least one multimedia file is abnormal comprises:
when the header of the at least one multimedia file is incomplete, determining that the at least one multimedia file is abnormal.

4. The failure detecting and repairing method according to claim 3, wherein the file repairing procedure repairs the at least one multimedia file whose header is incomplete or does not match the file majority.

5. The failure detecting and repairing method according to claim 3, wherein when a file length indicated by the header is different from a main body length of the file majority, the header does not match the file majority.

6. The failure detecting and repairing method according to claim 1, further comprising:
reading out a disk partition table about the storage device;
according to the disk partition table, determining whether the partitioning of the storage device is abnormal; and
sending out a warning message when the partitioning of the storage device is abnormal.

7. The failure detecting and repairing method according to claim 6, further comprising:
performing a data backup procedure or a data reconstruction procedure.

8. The failure detecting and repairing method according to claim 6, wherein the storage device comprises at least one disk partition, and the step of determining whether the partitioning of the storage device is abnormal, according to the disk partition table comprises:
from the disk partition table, reading out a first cylinder index, a last cylinder index, and a number of cylinders corresponding to the at least one disk partition; and
when the first cylinder index is not a default value, or when the last cylinder index is larger than the number of cylinders, determining that the storage device is abnormal.

9. The failure detecting and repairing method according to claim 8, wherein the warning message comprises the first cylinder index different from the default value, the last cylinder index larger than the number of cylinders, a disk name or a disk identifier of the disk partition that is abnormal, or a combination thereof.

10. A security surveillance apparatus with a networking function and a video recording function, comprising:
- an image receiving device, configured to receive multimedia data;
- a storage device connection interface, connecting to a storage device and configured to store at least one multimedia file; and
- a control device, connecting to the image receiving device and the storage device and configured to when the security surveillance apparatus starts up or when the storage device connects to the control device, perform the following steps:
  - detecting the storage device;
  - checking a file system for the storage device and determining whether the file system is abnormal;
  - repairing the file system by a file system repairing procedure when the file system is abnormal;
  - checking at least one multimedia file in the storage device and determining whether the at least one multimedia file is abnormal;
  - repairing the at least one multimedia file by a file repairing procedure when the at least one multimedia file is abnormal; and
  - mounting the storage device on the security surveillance apparatus,
- wherein the at least one multimedia file comprises a header and a file majority, and when the control device checks the at least one multimedia file in the storage device and determines whether the at least one multimedia file is abnormal, the control device determines that the at least one multimedia file with the header, which does not match the file majority, is abnormal; and
- wherein the control device checks a newly-updated file corresponding to a first updating time of the at least one multimedia file, and checks a file corresponding to a second updating time of the at least one multimedia file, and an interval between the first updating time and the second updating time being shorter than a threshold.

11. The security surveillance apparatus according to claim 10, wherein when the control device repairs the at least one multimedia file by the file repairing procedure, the control device corrects content corresponding to the at least one multimedia file in a database.

12. The security surveillance apparatus according to claim 10, wherein when the control device checks the at least one multimedia file in the storage device and determines whether the at least one multimedia file is abnormal, the control device determines that the at least one multimedia file with the header, which is incomplete, is abnormal.

13. The security surveillance apparatus according to claim 12, wherein the file repairing procedure repairs the at least one multimedia file with the header that is incomplete or does not match the file majority.

14. The security surveillance apparatus according to claim 12, wherein when a file length indicated by the header is different from a main body length of the file majority, the header does not match the file majority.

15. The security surveillance apparatus according to claim 10, wherein the control device reads out a disk partition table about the storage device; according to the disk partition table, the control device determines whether the partitioning of the storage device is abnormal; and when the partitioning of the storage device is abnormal, the control device sends out a warning message.

16. The security surveillance apparatus according to claim 15, wherein the storage device comprises at least one disk partition; when whether the partitioning of the storage device is abnormal is determined according to the disk partition table, the control device reads out a first cylinder index, a last cylinder index, and a number of cylinders corresponds to the at least one disk partition from the disk partition table; and when the first cylinder index is different from a default value, or when the last cylinder index is larger than the number of cylinders, the control device determines that the partitioning of the storage device is abnormal.

17. The security surveillance apparatus according to claim 16, wherein the warning message comprises the first cylinder index different from the default value, the last cylinder index larger than the number of cylinders, a disk name or a disk identifier of the disk partition that is abnormal, or a combination thereof.

18. The security surveillance apparatus according to claim 15, wherein the control device further performs a data backup procedure or a data reconstruction procedure.

\* \* \* \* \*